Oct. 24, 1939.                    C. E. REED                    2,177,333
              ROLLER CUTTER AND SPINDLE ASSEMBLY FOR EARTH BORING DRILLS
                              Filed Feb. 11, 1938
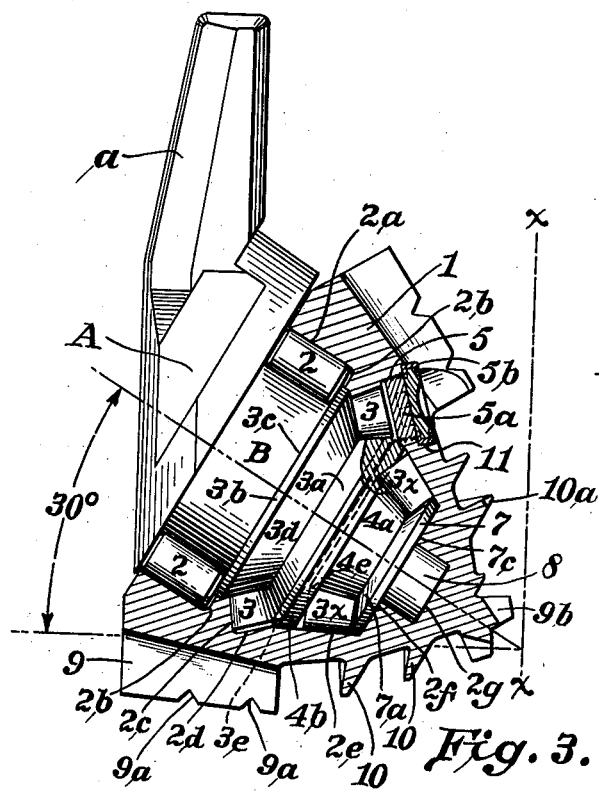
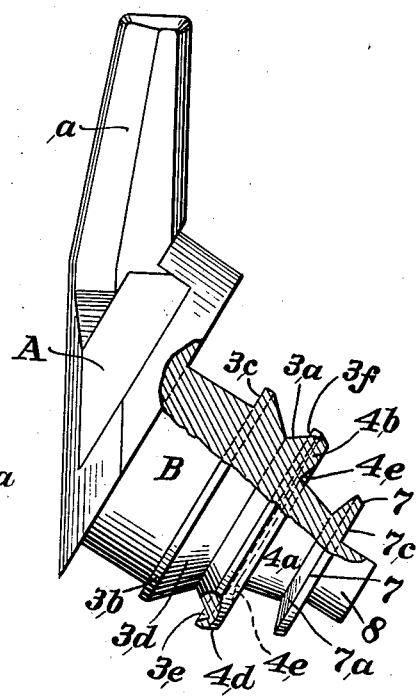
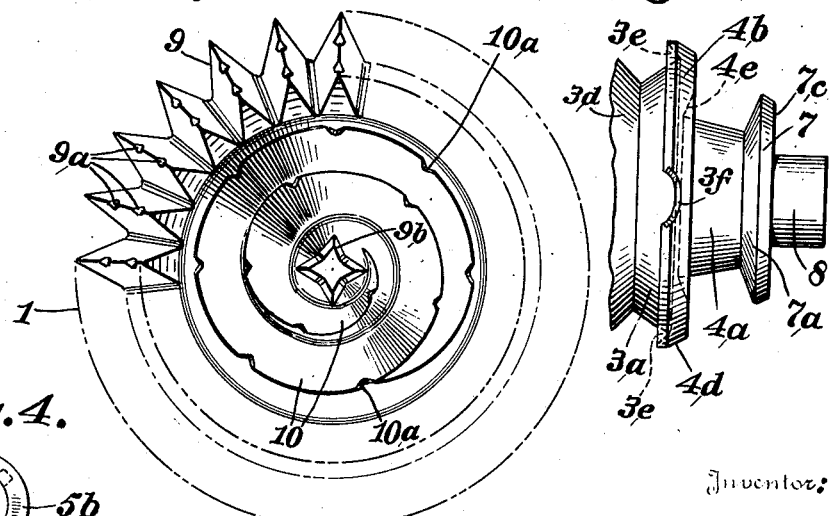
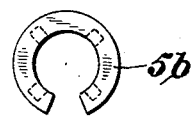
Inventor:
Clarence E. Reed,
Spear Donaldson & Hall
Attorneys.

Patented Oct. 24, 1939

2,177,333

UNITED STATES PATENT OFFICE 2,177,333

ROLLER CUTTER AND SPINDLE ASSEMBLY FOR EARTH BORING DRILLS

Clarence E. Reed, Wichita, Kans., assignor to Chicago Pneumatic Tool Company, New York, N. Y., a corporation of New Jersey Application February 11, 1938, Serial No. 190,067

12 Claims. (Cl. 255—71)

The invention is an improvement upon the general type of earth boring bits employing frusto-conical anti-friction roller bearings.

The invention consists in the features and combination and arrangement of parts hereinafter described and particularly pointed out in the appended claims.

In the accompanying drawing

Figure 1 is a central vertical sectional view of the roller cutter with the spindle support, and roller bearing organization shown partly in side elevation.

Fig. 2 is a side view of the spindle partly broken away.

Fig. 3 is an end view of the roller cutter looking from the right of Fig. 1 along the axis of the cutter.

Fig. 4 shows in detail a holding device, for retaining a plug closing a gateway in the roller cutter.

Fig. 4a is a cross section of the holding device or spring ring of Fig. 4.

Fig. 5 is a fragmental detail plan view of the outer end of the spindle, slightly enlarged.

Referring to the drawing, the toothed roller cutter 1 is of frusto-conical form, but the invention is not limited to this form of cutter. The spindle is shown at B having a base or body portion A from which extends substantially vertically a shank $a$ for attachment in any suitable manner, as by welding, to a bit head. At 2 are shown cylindrical roller bearings between the spindle and the roller cutter, said parts being formed with complementary cylindrical raceway surfaces. These roller bearings are located at the larger diameter portion of the bore of the cutter, which is open at its larger end and is closed at its apex. The cylindrical raceway in the bore of the cutter for the roller bearings 2 is provided by an annular recess $2a$, defined at its inner end by an annular wall $2b$ which is so located and related to the spindle structure as hereinafter pointed out, as to provide clearance between itself and the end face of the cylindrical roller bearing 2 at the inner end thereof. The structure is such that the frusto-roller cutter can be slipped into place over these cylindrical roller bearings after the latter have been placed in the raceway of the spindle. There are two sets of frusto-conical roller bearings 3 and $3x$, those of set 3 having their larger diameter end faces directed inwardly toward the vertical axis $x$ of the drill and tapering toward the outer side of the drill, or in other words, toward the base of the spindle, and those of set $3x$ having their larger diameter end faces directed outwardly toward the base or body portion A of the spindle. The spindle has a frusto-conical raceway $3a$ for the frusto-conical roller bearings 3 and a frusto-conical raceway $4a$ for the frusto-conical roller bearings $3x$. There is a flange $3b$ on the spindle between the raceway B and the raceway $3a$. This flange has its annular outer face or shoulder $3c$ lying in a plane at a right angle to the axis of the spindle. Said outer face overlies the inner end faces of the cylindrical roller bearings 2 for about one-half the diameter of said face. The flange $3b$ has a frusto-conical annular face $3d$ tapering toward the vertical axis $x$—$x$ of the drill, which provides a surface defining the raceway $3a$, with which surface $3d$ the smaller diameter outer end faces of the frusto-conical roller bearings engage while the peripheral surface of said bearings roll upon the raceway surface $3a$.

Between the frusto-conical raceway surface $3a$ which tapers outwardly and the frusto-conical raceway surface $4a$ which tapers inwardly toward the vertical axis of the drill, there is a flange $4b$ which is undercut at $3e$ on its outer face. This flange presents a frusto-conical surface $4d$ tapering toward the vertical axis of the drill. It is undercut at $4e$.

There is also a flange 7 on the spindle with an outer face $7a$ tapering outwardly and an inner face or shoulder $7c$ lying in a plane at right angles to the axis of the spindle. From this last mentioned face a reduced diameter cylindrical end portion 8 of the spindle projects, toward the vertical axis of the drill.

The bore of the roller cutter, besides having the raceway $2a$ in its bore defined by the annular wall $2b$, also has a raceway surface $2c$ for the frusto-conical bearing rollers 3, a wall $2d$ opposite the larger diameter end face of said roller bearings 3, which together with the raceway surface $2c$ defines an angular groove in the rotary cutter bore in which the frusto-conical roller bearings 3 lie. The annular wall $2d$ has clearance between itself and the larger diameter end face of the frusto-conical roller bearing 3. The roller cutter bore also has an annular raceway surface $2e$ tapering toward the vertical axis of the drill upon which the roller bearings $3x$ travel. There is also a shoulder $2f$ within the apex of the roller cutter adapted to frictionally bear on the flat annular face $7c$ of the flange 7, on the spindle, and there is also a cylindrical socket $2g$ which receives the reduced diameter cylindrical projection 8 on the spindle, said socket being within the apex portion of the roller cutter.

The undercut 3e of the flange 4b of the spindle provides a wall defining the raceway 3a and this undercut wall is engaged by a portion of the end faces of the frusto-conical roller bearings 3. Likewise the undercut 4e provides a wall defining the raceway 4a for the frusto-conical roller bearings 3x, and the wall of this undercut is engaged by a portion of the larger diameter end faces of the roller bearings 3x. It will be seen that the frusto-conical roller bearings 3 engage at both of their end faces parts of the spindle. That is to say they engage at their smaller diameter end faces the frusto-conical annular surface 3d and at their larger diameter end faces they engage the wall of the undercut 3e of the spindle flange 4b. The frusto-conical roller bearings 3x engage at their smaller diameter end faces the tapered surface 7a of the spindle and at their larger diameter end faces they engage the wall of the undercut 4e of the spindle. All of the sets of roller bearings take loads radial to the axis of the cutter. The frusto-conical roller bearings 3x take upon their peripheries end thrust of the roller cutter outwardly from the vertical axis of the drill. They relieve both the cylindrical roller bearings and the frusto-conical roller bearings 3 of thrust of the roller cutter outwardly from the vertical axis of the drill.

The frusto-conical roller bearings 3 serve also to lock the roller cutter rotatively on the spindle.

They are introduced into or removed from place through a gateway 5 in the wall of the roller cutter, which gateway is axially in line with the axis of frusto-conical roller bearings when in registration therewith. This gateway is closed by a plug 5a screwed into place by any suitable form of wrench engaging a socket in the plug. The plug is held in place by a U shaped spring member 5b. When seated in a groove 11 in the cutter wall in front of the plug, this member may be secured in place by welding. This spring member is about ⅛″ thick and the groove 11 is about $\tfrac{1}{16}$″ in depth, so that the ring will overlap the joint between the wall of the cutter and the plug. Small holes are formed in the spring member and the cavity within it is filled with welding material or preferably with Babbitt metal to avoid high heat of welding. This closure means for the gateway will prevent loss of the plug. The primary purpose is to keep mud from entering the raceway.

The exterior formation of the frusto-conical roller cutter comprises wide teeth 9 at the base zone of the cutter extending in planes radial to the axis of the cutter. These teeth are notched at 9a.

The apex zone of the cutter is at an inclination to the base zone and has an annular row of narrow teeth 9b at its extreme inner end. A spiral cutter blade 10 occupies that portion of the apex zone lying between the teeth 9 and 9b. As shown in the sectional view of Fig. 1 the spiral cutter blade in cross section tapers from its base at the surface of the apex zone of the cutter to its edge. It is undercut at its side facing the base of the cutter instead of on that side which faces the apex of the cutter. This spiral cutter member is notched at 10a. The base cutting zone, i. e., the frusto-conical portion having the teeth 9 thereon does not have a true rolling motion on the bottom of the hole, but on the contrary, has a scraping action on the formation, which action is imparted to the spiral cutting blade. The toothed base zone dominates the action and the non-true rolling action of the cutter is the result. The tendency of the cutter is to move bodily towards the center of the hole being bored and its reaction against the earth which is being cut is in a backward direction, thus giving the best results in disintegrating the earth formation as compared with a cutter having a spiral blade undercut on its side facing the apex of the cutter.

When a plurality of cutters are arranged around the vertical axis of the drill, say for instance 120° apart, the spirals will be both right and left hand lead viewed from the apex of the cutter.

It will be seen that the spindle is in one piece. The flanges are integral therewith. The end faces of all the roller bearings contact with shoulders on the spindle and not with surfaces within the bore of the cutter. One of these shoulders presents its face 3c to be contacted by the inner end face of the cylindrical roller bearing 2, preventing it from contacting with the wall of the cutter. At the larger end of the tapered raceway 3a for the frusto-conical roller bearings 3 is the ring or flange 4b presenting its undercut surface 3e for receiving contact of the larger end faces of the roller bearings 3 keeping said end faces out of contact with the bore wall of the cutter at this zone.

It will be noticed that the shoulder formed by this undercut at 3e will prevent the roller bearing from falling out of place when at the lower part of the unit, even though the gateway in the cutter is open due to the loss of the closing plug. This is due to the fact that the extension 3f of this gateway through the flange or annular rib 4b is permanently located at the top side of the spindle, which because the spindle is a fixture always remains at said top side. This flange or rib with its shoulder or face 3e at the lower portion of the unit is intact and therefore when the roller bearings 3 are inserted into the raceway 3a they will be retained in place while traversing the lower part of the raceway by engaging the intact rib or flange 4b at the point or points where the roller bearings, subject to gravitation, would have a tendency to fall out of place were it not for the presence of the intact portion of the rib or flange 4b at this point.

As above stated, the closure for the gateway in the roller cutter is primarily to keep mud out of the raceway of the spindle.

The holding of the roller bearings 3 in their raceway is also a function of the plug, but the arrangement is such that the surface 3e resulting from undercutting the spindle 4b is the main reliance for retaining said frusto-conical roller bearings at work, this surface or flange being intact throughout except for the small portion 3f at the top side of the spindle. At this point, because the raceway surface tapers towards the base of the spindle, the tendency of gravitation will be to keep the roller bearing in its prescribed place in relation to the raceway.

I claim:

1. A roller cutter and spindle unit for earth boring drills comprising a roller cutter, a spindle having a frusto-conical raceway bounded at its smaller diameter end by a frusto-conical portion integral therewith and at its larger diameter end by a substantially annular shoulder integral therewith, frusto-conical roller bearings in the raceway bearing with a portion of their end faces against said shoulder, a gateway through the wall of the roller cutter and a gateway through the said shoulder forming a continuation of the gateway of the roller cutter when the said cutter is turned to align with the gateway of the shoulder, the said gateway in the shoulder being located at a point spaced from the lower side of the spindle where said shoulder is intact, and means for closing the gateway in the roller cutter, substantially as described.

2. A roller cutter and spindle assembly according to claim 1 in which the gateway in the shoulder of the spindle is located at the top side of the spindle.

3. A roller cutter and spindle assembly according to claim 1 in which the frusto-conical roller bearings have their larger end faces which contact said shoulder directed towards the vertical axis of the drill in relation to which the roller cutter assembly is in offside relation.

4. A roller cutter and spindle assembly according to claim 1 in which the frusto-conical rollers are arranged with their larger end faces which contact the shoulder directed towards the vertical axis of the drill, while their smaller diameter faces contact frusto-conical surfaces of the spindle converging with the frusto-conical raceway, substantially as described.

5. A roller cutter and spindle assembly according to claim 1 in which said substantially annular shoulder forms one face of a substantially annular flange integral with the spindle, which flange adjoins a second frusto-conical raceway tapering in the opposite direction from the taper of the frusto-conical raceway first mentioned, said second raceway being defined on one side by an undercut shoulder on the said flange, and a second set of frusto-conical roller bearings in the second raceway having their larger diameter ends facing outwardly from the vertical axis of the drill, and bearing in part upon the last mentioned undercut shoulder.

6. A roller cutter and spindle assembly according to claim 1 in which the roller cutter has an angular groove, one wall of which lies opposite the larger end face of the frusto-conical roller bearing and the other wall of which intersects the first mentioned wall and lies along the outer side of the tapered surface of the frusto-conical roller which thereby rotatively locks the roller cutter to the spindle.

7. A roller cutter and spindle assembly according to claim 1 in which said substantially annular shoulder forms one face of a substantially annular flange integral with the spindle, which flange adjoins a second frusto-conical raceway tapering in the opposite direction from the taper of the frusto-conical raceway first mentioned, said second raceway being defined on one side by an undercut shoulder on the said flange, and a second set of frusto-conical roller bearings in the second raceway having their larger diameter ends facing outwardly from the vertical axis of the drill, and bearing in part upon the last mentioned undercut shoulder, a flange on the spindle having a frusto-conical surface against which the smaller diameter end faces of the second set of frusto-conical rollers bear over which the roller cutter can move when placed in position on the spindle.

8. A roller cutter and spindle assembly according to claim 1 in which the spindle has a cylindrical raceway at its base defined on one side by a flange on said spindle presenting a shoulder, said flange having a frusto-conical surface, the large diameter of which is of greater diameter than the diameter of the cylindrical raceway, against which the smaller diameter ends of the frusto-conical rollers bear and cylindrical roller bearings on said cylindrical raceway having their inner end faces bearing upon said flange, the roller cutter having a cylindrical raceway open at its base complementary to the cylindrical raceway on the spindle, enabling said roller cutter to be slipped over said cylindrical roller bearings, said frusto-conical roller bearings rotatively locking said roller cutter in place.

9. A spindle for a roller cutter of an earth boring drill having a shank extending up from its base and a free end, a cylindrical raceway at said base defined at its outer side by an annular shoulder on the base, and at its inner side by a shoulder on the outer side of an annular integral flange, said flange having a frusto-conical surface on its inner side, a frusto-conical raceway surface tapered outwardly towards the base of the spindle and meeting at its smaller end the smaller end of said frusto-conical surface, said frusto-conical raceway being defined by a shoulder at its larger diameter end consisting of a second integral flange having an undercut on its outer side, said flange having also an undercut on its inner side, a frusto-conical raceway tapering inwardly towards the free end of the spindle, defined at its larger diameter end by the undercut last mentioned, and a flange defining the smaller diameter end of said last mentioned raceway having a surface tapered outwardly towards the base of the spindle, said second flange having a gateway for the passage therethrough of frusto-conical roller bearings into place on the first mentioned frusto-conical raceway, substantially as described.

10. A spindle for a roller cutter of an earth boring drill having a cylindrical raceway defined at one side by an annular shoulder and at its other side by a shoulder on an annular flange, said flange having a frusto-conical surface on its other side, a frusto-conical raceway surface tapering towards one end of the spindle and meeting at its smaller end the smaller end of said frusto-conical surface, said frusto-conical raceway being defined by a shoulder at its larger diameter end consisting of a flange having an undercut, said flange having also an undercut on its other side, a frusto-conical raceway tapering towards the other end of the spindle, defined at its larger diameter end by the undercut last mentioned, a flange defining the smaller diameter end of said last mentioned raceway having a surface tapered towards the first mentioned end of the spindle, and a gateway in the said undercut flange leading to the frusto-conical raceway surface first mentioned.

11. A roller cutter and spindle assembly for earth boring drills comprising a spindle of generally tapered form having a frusto-conical raceway defined at its smaller diameter end by a frusto-conical portion and at its larger diameter end by a flange having an undercut annular shoulder, other raceway portions one on each side of the first mentioned raceway, that one of said other raceway portions which is nearest the small end of the tapered spindle being defined at its larger diameter end by an undercut shoulder in said flange of smaller diameter than the undercut annular shoulder first mentioned, said spindle with its raceway portions, flange and undercut shoulders being in one piece, a gateway through the first mentioned shoulder removed from the bottom side of the spindle, frusto-conical anti-friction bearing rollers for the frusto-conical raceway first mentioned adapted to pass through said gateway, a roller cutter having a gateway to register with the gateway through the said shoulder and roller bearings in said other raceways.

12. In a rotary earth boring drill, a spindle having a frusto-conical raceway for the reception of tapered rollers and having an integral flange at the larger diameter end of the raceway adapted to abut against the larger ends of the rollers to retain them in position, characterized in that the flange is provided with a gateway to permit the movement of a roller along its own axis into operative position in the raceway through said flange, said gateway being of restricted size to prevent axial movement of more than one roller relative to the spindle at one time.

CLARENCE E. REED.